(12) United States Patent
Patel

(10) Patent No.: US 10,956,402 B2
(45) Date of Patent: Mar. 23, 2021

(54) METHOD AND SYSTEM FOR AUTOMATICALLY DETECTING ERRORS IN AT LEAST ONE DATE ENTRY USING IMAGE MAPS

(71) Applicant: Visa International Service Association, San Francisco, CA (US)

(72) Inventor: Hima Patel, Doddanekundi (IN)

(73) Assignee: Visa International Service Association, San Francisco, CA (US)

(*) Notice: Subject to any disclaimer, the term of this patent is extended or adjusted under 35 U.S.C. 154(b) by 207 days.

(21) Appl. No.: 15/952,699

(22) Filed: Apr. 13, 2018

(65) Prior Publication Data

US 2019/0318024 A1 Oct. 17, 2019

(51) Int. Cl.
*G06F 16/23* (2019.01)
*G06F 40/205* (2020.01)

(52) U.S. Cl.
CPC ...... *G06F 16/2365* (2019.01); *G06F 16/2379* (2019.01); *G06F 40/205* (2020.01)

(58) Field of Classification Search
CPC .................................................. G06F 16/2365
See application file for complete search history.

(56) References Cited

U.S. PATENT DOCUMENTS

| 5,438,628 A | 8/1995 | Spitz et al. |
| 5,799,301 A | 8/1998 | Castelli et al. |
| 2005/0198563 A1 | 9/2005 | Kristjansson |
| 2005/0240569 A1 | 10/2005 | Cheng et al. |
| 2014/0095476 A1 | 4/2014 | Valentin |
| 2015/0032738 A1 | 1/2015 | Nachnani et al. |
| 2017/0004413 A1* | 1/2017 | Flores .................. G06F 16/285 |
| 2018/0025256 A1* | 1/2018 | Bai ......................... G06K 9/62 382/229 |

OTHER PUBLICATIONS

Redondi et al., "Compress-then-analyze vs. analyze-then-compress: Two paradigms for image analysis in visual sensor networks", 2013, IEEE. (Year: 2013).*
Pang et al., "Text Matching as Image Recognition", Proceedings of the Thirtieth AAAI Conference on Artificial Intelligence, 2016, pp. 2793-2799.

* cited by examiner

*Primary Examiner* — Sheryl L Holland
(74) *Attorney, Agent, or Firm* — The Webb Law Firm

(57) ABSTRACT

A method for automatically detecting errors in at least one data entry in a database, the at least one data entry including an input string of characters that do not match at least one predefined string of characters. The method includes generating a first image map; generating at least one classification parameter by comparing the first image map to a second image map, the second image map based at least partially on the predefined string of characters; determining that the input string of characters correlates to the predefined string of characters; and modifying the at least one data entry to match the predefined string of characters in response to determining that the input string of characters correlates to the predefined string of characters. Various other methods and systems for automatically detecting errors in at least one data entry in a database are also disclosed.

14 Claims, 6 Drawing Sheets

T-Shirt Order Form

First Name: John  Last Name: Smith  City: Fo8t4r Ci6y  State: CA
Street Address: 101 Main St.  Zip: 94404
Payment Card Number: xxxx-xxxx-xxxx-1234

T-Shirt Size: ○ Small
○ Mediun
● Large
○ X-Large

T-Shirt Color: ○ Black
● Gray
○ White

[Submit]

FIG. 1A

| First Name | Last Name | Street Address | City | State | ... |
|---|---|---|---|---|---|
| John | Smith | 101 Main St. | Fo8t4r Ci6y | CA | |
| Steve | Jones | 70 Lark Rd. | New York | NY | |
| Sally | Waters | 10087 Elm Rd., Apt B | SanFrancisco | CA | |
| Samuel | Stephens | 3 Washington Way | Denver | CO | |
| Walter | Swift | 100 Pennsylvnia Ave. | Picksburgh | PA | |
| Elizabeth | Beckett | 7254 Fuscia Blvd. | Jackson Hole | WY | |
| Rico | Walters | 2454 Crimson St., Apt 4 | Phoenix | AZ | |

FIG. 1B

| First Name | Last Name | Street Address | City | State | ... |
|---|---|---|---|---|---|
| John | Smith | 101 Main St. | Foster City | CA | |
| Steve | Jones | 70 Lark Rd. | New York | NY | |
| Sally | Waters | 10087 Elm Rd., Apt B | San Francisco | CA | |
| Samuel | Stephens | 3 Washington Way | Denver | CO | |
| Walter | Swift | 100 Pennsylvnia Ave. | Pittsburgh | PA | |
| Elizabeth | Beckett | 7254 Fuscia Blvd. | Jackson Hole | WY | |
| Rico | Walters | 2454 Crimson St., Apt 4 | Phoenix | AZ | |

FIG. 1C

METHOD AND SYSTEM FOR AUTOMATICALLY DETECTING ERRORS IN AT LEAST ONE DATE ENTRY USING IMAGE MAPS

BACKGROUND OF THE INVENTION

Field of the Invention

This invention relates to methods and systems for automatically detecting errors in at least one data entry.

Description of Related Art

Freeform fields completed by users as user input can include errors, such as spelling errors, shortened versions, or additional "junk" characters that confuse the actual and the intended data entries. User input errors compromise the database in which they are entered with misinformation.

In many cases, the data entered into a database is then used to complete other tasks. As one example, data included in a database (e.g., address information, account data, merchant information, and the like) can be used to complete tasks associated with transactions, such as authorization of the transaction, shipment of the goods associated with the transaction, and many more. Therefore, the user input errors in the database can lead to errors occurring during completion of the transaction. User input errors can also frustrate downstream tasks in many other scenarios in which data from a database is used to complete further tasks or can even generate misleading results when that data is used for activities associated with analytics.

SUMMARY OF THE INVENTION

Accordingly provided are improved methods and systems for automatically detecting errors in at least one data entry.

According to one non-limiting embodiment or aspect, provided is a method of automatically detecting errors in at least one data entry in a database, the at least one data entry including an input string of characters that do not match at least one predefined string of characters, the method including: generating, with at least one processor and based at least partially on the input string of characters, a first image map; generating, with at least one processor, at least one classification parameter by comparing the first image map to a second image map, the second image map based at least partially on the predefined string of characters; determining, with at least one processor and based at least partially on the classification parameter, that the input string of characters correlates to the predefined string of characters; and modifying, with at least one processor, the at least one data entry to match the predefined string of characters in response to determining that the input string of characters correlates to the predefined string of characters.

In one non-limiting embodiment or aspect, determining that the input string of characters correlates to the predefined string of characters may include: generating, with at least one processor, a predictive model for determining correlations between image maps, the predictive model based at least partially on image maps generated from historic data entries; and determining, with at least one processor, that the input string of characters corresponds to the predefined string of characters based at least partially on application of the predictive model to the first image map. The first image map and the second image map may each include: (i) columns corresponding to character position within a respective string of characters and (ii) rows corresponding to a character index in a character set, the columns and rows defining a matrix, where each character represented by the first image map and the second image map is represented by a location in the matrix associated with a column and a row. A length of the input string of characters may be different from a length of the predefined string of characters. The first image map and the second image map may be generated to have a same dimension corresponding to either the length of the input string of characters or the length of the predefined string of characters. The first image map and the second image map may be compressed prior to generating the classification parameter. The at least one data entry may be manually inputted by a user into a freeform input field.

According to one non-limiting embodiment or aspect, provided is a method of automatically detecting errors in at least one data entry in a database, the at least one data entry including an input string of characters that do not match at least one predefined string of characters, the method including: generating, with at least one processor and based at least partially on the input string of characters of the at least one data entry, a first image map; generating, with at least one processor, a first classification parameter by comparing the first image map to a second image map, the second image map based at least partially on the predefined string of characters; determining, with at least one processor and based at least partially on the first classification parameter, that the input string of characters does not correlate to the predefined string of characters; in response to determining that the input string of characters does not correlate to the predefined string of characters, generating a second classification parameter by comparing the first image map to a third image map, the third image map based at least partially on a stored string of characters representative of a prior non-correlated data entry; and storing, with at least one processor and based at least partially on the second classification parameter, the at least one data entry in a database in association with the prior non-correlated data entry, such that the input string of characters and/or the stored string of characters form a new predefined string of characters for comparison to subsequent data entries.

In one non-limiting embodiment or aspect, determining that the input string of characters does not correlate to the predefined string of characters may include: generating, with at least one processor, a predictive model for determining correlations between image maps, the predictive model based at least partially on image maps generated from historic data entries; and determining, with at least one processor, that the input string of characters does not correspond to the predefined string of characters based at least partially on application of the predictive model to the first image map. The first image map, the second image map, and the third image map may each include: (i) columns corresponding to character position within a respective string of characters and (ii) rows corresponding to a character index in a character set, the columns and rows defining a matrix, where each character represented by the first image map and the second image map is represented by a location in the matrix associated with a column and a row. A length of the input string of characters may be different from a length of the predefined string of characters. The first image map and the second image map may be generated to have a same dimension corresponding to either the length of the input string of characters or the length of the predefined string of characters. The first image map, the second image map, and the third image map may be compressed prior to generating the classification parameter. The at least one data entry may be manually inputted by a user into a freeform input field.

According to one non-limiting embodiment or aspect, provided is a system for automatically detecting errors in at least one data entry in a database, the at least one data entry including an input string of characters that do not match at least one predefined string of characters, the system including at least one server computer including at least one processor, the at least one server computer programmed and/or configured to: generate, based at least partially on the input string of characters, a first image map; generate at least one classification parameter by comparing the first image map to a second image map, the second image map based at least partially on the predefined string of characters; determine, based at least partially on the classification parameter, whether the input string of characters correlates to the predefined string of characters; and modify the at least one data entry to match the predefined string of characters in response to determining that the input string of characters correlates to the predefined string of characters.

In one non-limiting embodiment or aspect, to determine that the input string of characters correlates to the predefined string of characters, the at least one server computer may be further programmed and/or configured to: generate a predictive model for determining correlations between image maps, the predictive model based at least partially on image maps generated from historic data entries; and determine that the input string of characters corresponds to the predefined string of characters based at least partially on application of the predictive model to the first image map. The first image map and the second image map may each include: (i) columns corresponding to character position within a respective string of characters and (ii) rows corresponding to a character index in a character set, the columns and rows defining a matrix, where each character represented by the first image map and the second image map is represented by a location in the matrix associated with a column and a row. A length of the input string of characters may be different from a length of the predefined string of characters. The first image map and the second image map may be generated to have a same dimension corresponding to either the length of the input string of characters or the length of the predefined string of characters. The first image map and the second image map may be compressed prior to generating the classification parameter. The at least one data entry may be manually inputted by a user into a freeform input field.

In one non-limiting embodiment or aspect, in response to determining that the input string of characters does not correlate to the predefined string of characters, the at least one processor may be further programmed and/or configured to generate a second classification parameter by comparing the first image map to a third image map, the third image map based at least partially on a stored string of characters representative of a prior non-correlated data entry. The at least one processor may be further programmed and/or configured to store, based at least partially on the second classification parameter, the at least one data entry in a database in association with the prior non-correlated data entry, such that the input string of characters and/or the stored string of characters form a new predefined string of characters for comparison to subsequent data entries.

Further embodiments or aspects are set forth in the following numbered clauses:

Clause 1: A method of automatically detecting errors in at least one data entry in a database, the at least one data entry comprising an input string of characters that do not match at least one predefined string of characters, the method comprising: generating, with at least one processor and based at least partially on the input string of characters, a first image map; generating, with at least one processor, at least one classification parameter by comparing the first image map to a second image map, the second image map based at least partially on the predefined string of characters; determining, with at least one processor and based at least partially on the classification parameter, that the input string of characters correlates to the predefined string of characters; and modifying, with at least one processor, the at least one data entry to match the predefined string of characters in response to determining that the input string of characters correlates to the predefined string of characters.

Clause 2: The method of clause 1, wherein determining that the input string of characters correlates to the predefined string of characters comprises: generating, with at least one processor, a predictive model for determining correlations between image maps, the predictive model based at least partially on image maps generated from historic data entries; and determining, with at least one processor, that the input string of characters corresponds to the predefined string of characters based at least partially on application of the predictive model to the first image map.

Clause 3: The method of clause 1 or 2, wherein the first image map and the second image map each comprise: (i) columns corresponding to character position within a respective string of characters and (ii) rows corresponding to a character index in a character set, the columns and rows defining a matrix, wherein each character represented by the first image map and the second image map is represented by a location in the matrix associated with a column and a row.

Clause 4: The method of any of clauses 1-3, wherein a length of the input string of characters is different from a length of the predefined string of characters, and wherein the first image map and the second image map are generated to have a same dimension corresponding to either the length of the input string of characters or the length of the predefined string of characters.

Clause 5: The method of any of clauses 1-4, wherein the first image map and the second image map are compressed prior to generating the classification parameter.

Clause 6: The method of any of clauses 1-5, wherein the at least one data entry is manually inputted by a user into a freeform input field.

Clause 7: A method of automatically detecting errors in at least one data entry in a database, the at least one data entry comprising an input string of characters that do not match at least one predefined string of characters, the method comprising: generating, with at least one processor and based at least partially on the input string of characters of the at least one data entry, a first image map; generating, with at least one processor, a first classification parameter by comparing the first image map to a second image map, the second image map based at least partially on the predefined string of characters; determining, with at least one processor and based at least partially on the first classification parameter, that the input string of characters does not correlate to the predefined string of characters; in response to determining that the input string of characters does not correlate to the predefined string of characters, generating a second classification parameter by comparing the first image map to a third image map, the third image map based at least partially on a stored string of characters representative of a prior non-correlated data entry; and storing, with at least one processor and based at least partially on the second classification parameter, the at least one data entry in a database in association with the prior non-correlated data entry, such that the input string of characters and/or the stored string of characters form a new predefined string of characters for comparison to subsequent data entries.

Clause 8: The method of clause 7, wherein determining that the input string of characters does not correlate to the predefined string of characters comprises: generating, with at least one processor, a predictive model for determining correlations between image maps, the predictive model based at least partially on image maps generated from historic data entries; and determining, with at least one processor, that the input string of characters does not correspond to the predefined string of characters based at least partially on application of the predictive model to the first image map.

Clause 9: The method of clause 7 or 8, wherein the first image map, the second image map, and the third image map each comprise: (i) columns corresponding to character position within a respective string of characters and (ii) rows corresponding to a character index in a character set, the columns and rows defining a matrix, wherein each character represented by the first image map and the second image map is represented by a location in the matrix associated with a column and a row.

Clause 10: The method of any of clauses 7-9, wherein a length of the input string of characters is different from a length of the predefined string of characters, and wherein the first image map and the second image map are generated to have a same dimension corresponding to either the length of the input string of characters or the length of the predefined string of characters.

Clause 11: The method of any of clauses 7-10, wherein the first image map, the second image map, and the third image map are compressed prior to generating the classification parameter.

Clause 12: The method of any of clauses 7-11, wherein the at least one data entry is manually inputted by a user into a freeform input field.

Clause 13: A system for automatically detecting errors in at least one data entry in a database, the at least one data entry comprising an input string of characters that do not match at least one predefined string of characters, the system comprising at least one processor configured to: generate, based at least partially on the input string of characters, a first image map; generate at least one classification parameter by comparing the first image map to a second image map, the second image map based at least partially on the predefined string of characters; determine, based at least partially on the classification parameter, whether the input string of characters correlates to the predefined string of characters; and modify the at least one data entry to match the predefined string of characters in response to determining that the input string of characters correlates to the predefined string of characters.

Clause 14: The system of clause 13, wherein, to determine that the input string of characters correlates to the predefined string of characters, the at least one processor is further programmed and/or configured to: generate a predictive model for determining correlations between image maps, the predictive model based at least partially on image maps generated from historic data entries; and determine that the input string of characters corresponds to the predefined string of characters based at least partially on application of the predictive model to the first image map.

Clause 15: The system of clause 13 or 14, wherein the first image map and the second image map each comprise: (i) columns corresponding to character position within a respective string of characters and (ii) rows corresponding to a character index in a character set, the columns and rows defining a matrix, wherein each character represented by the first image map and the second image map is represented by a location in the matrix associated with a column and a row.

Clause 16: The system of any of clauses 13-15, wherein a length of the input string of characters is different from a length of the predefined string of characters, and wherein the first image map and the second image map are generated to have a same dimension corresponding to either the length of the input string of characters or the length of the predefined string of characters.

Clause 17: The system of any of clauses 13-16, wherein the first image map and the second image map are compressed prior to generating the classification parameter.

Clause 18: The system of any of clauses 13-17, wherein the at least one data entry is manually inputted by a user into a freeform input field.

Clause 19: The system of any of clauses 13-18, wherein in response to determining that the input string of characters does not correlate to the predefined string of characters, the at least one processor is further programmed and/or configured to generate a second classification parameter by comparing the first image map to a third image map, the third image map based at least partially on a stored string of characters representative of a prior non-correlated data entry.

Clause 20: The system of any of clauses 13-19, wherein the at least one processor is further programmed and/or configured to store, based at least partially on the second classification parameter, the at least one data entry in a database in association with the prior non-correlated data entry, such that the input string of characters and/or the stored string of characters form a new predefined string of characters for comparison to subsequent data entries.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which:

FIG. 1A shows a non-limiting embodiment or aspect of a graphical user interface having a freeform input field;

FIG. 1B shows a non-limiting embodiment or aspect of a back-end of a database containing data input by users of the graphical user interface of FIG. 1A, the data containing typographical errors;

FIG. 1C shows a non-limiting embodiment or aspect of a modified back-end of the database of FIG. 1B with the typographical errors automatically corrected;

DESCRIPTION OF THE INVENTION

Figures 2, 3:
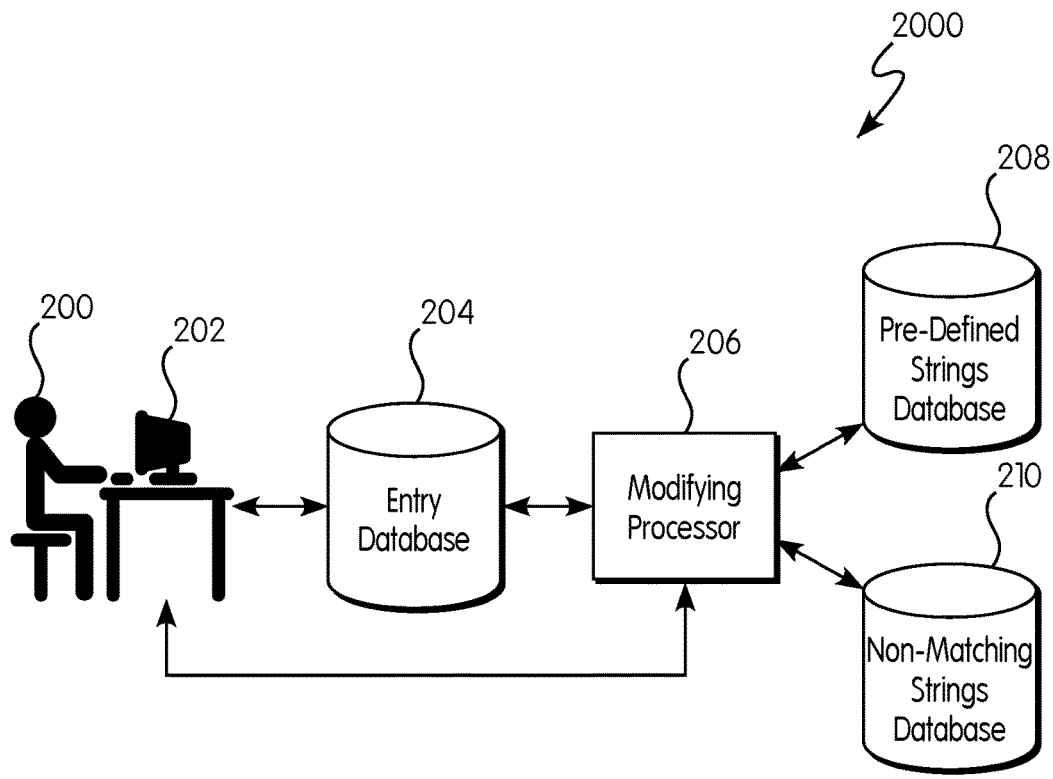
FIG. 2 is a non-limiting embodiment or aspect of a system for automatically detecting errors in at least one data entry.
FIG. 3 shows a non-limiting embodiment or aspect of an image map of an input string.

For purposes of the description hereinafter, the terms "end", "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

The term "selectable option," as used herein, refers to one or more buttons, radio buttons, checkboxes, links, drop-down menus, text boxes, icons, and/or other like options that are selectable by a user through any type of input.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system", such as a merchant's point-of-sale system. Reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. In other non-limiting embodiments, the computing device may be a desktop computer or other non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

Non-limiting embodiments or aspects of the invention are directed to methods and systems for automatically detecting errors in at least one data entry in a database. Non-limiting embodiments or aspects of the methods and systems allow for the modification of data entries including errors, modifying including replacing, amending, or otherwise altering the incorrect data entry (such as a misspelling, abbreviation, or entry with junk text) with the intended, correct data entry to result in a more accurate database. Non-limiting embodiments or aspects of the invention include predefined strings of characters that may be compared to the data entry including an error in the image domain so as to identify the intended and accurate data entry. Non-limiting embodiments or aspects provide for a modified database that contains fewer incorrect data entries because data entries containing errors can be automatically identified and updated. Non-limiting embodiments or aspects of the invention convert the data entry from a text domain to an image domain, generating specific patterns from the data entry, which may then be compressed. The compressed patterns make data entries containing errors appear more similar to images of similar text entries without the errors, leading to a more effective correlation determination compared to correlation determinations conducted only in the text domain. Non-limiting embodiments or aspects of the invention also provide for the reduction of errors of downstream processes (transaction processing or analytics, for example) that use data entries in databases because the data entries used have been modified to remove errors associated with faulty user input. Non-limiting embodiments or aspects of the invention also allow for entries not included in the predefined strings database, but which have been added to the database by multiple different users (suggesting that the entry actually does not contain an error), to be added to the predefined strings database according to certain rules. In this way, the system can self-learn new, correct data entries, as opposed to identifying them as potential misinformation and improve itself over time.

Referring to FIG. 1A, a non-limiting embodiment of a graphical user interface (GUI) 100 is shown. The GUI 100 may include freeform input fields 10, which allow a user to manually specify the character or string of characters to be inputted in the freeform input field 10. Characters, as used herein, refers to letters, numbers, punctuation, a null value, or any other type of character and/or symbol. String of characters, as used herein, refers to any combination of two or more characters. In the GUI 100 shown in FIG. 1A, "First Name", "Last Name", "Street Address", "City", "State", "Payment Card Number", and "Zip" are all freeform input fields 10. Other types of fields may be included in the GUI 100. For instance, the GUI may include various selectable options, such as the radio buttons for "T-Shirt Size" and "T-Shirt Color" in FIG. 1A.

Referring to FIGS. 1B and 1C, non-limiting embodiments of back-end databases 110, 120 containing data input from users of the GUI 100 of FIG. 1A are shown. The back-end of the databases 110, 120 may include data entries (e.g., 112a-c and 122a-c), which correspond to data entered by the user into the input fields of the GUI 100 of FIG. 1A. The data entries 112a-c, 122a-c may include strings of characters, as shown.

Referring to FIG. 1B, an original back-end database 110 includes the data entries 112a-c exactly as they were entered into the GUI 100 from FIG. 1A by a user. Certain of the data entries 112a-c include various errors, and these flawed entries are circled in FIG. 1B. The errors can be of the same type as shown in FIG. 1B, or any other type of data entry error is contemplated.

Referring to FIG. 1C, a modified back-end database 120 includes modified data entries 122a-c, which correct the flawed data entries 112a-c from FIG. 1B. Data entry 112a from FIG. 1B ("Fo8t4r City") was modified to "Foster City". Data entry 112b from FIG. 1B ("San Francisco") was modified to "San Francisco". Data entry 112c from FIG. 1B ("Picksburgh") was modified to "Pittsburgh". Thus, the modified back-end database 120 contains fewer errors compared to the original back-end database 110. In some examples, the data entries are modified before they are included in a back-end database, such that the original back-end database 110 is not included. In this manner, the flawed data entries from the user are modified before that data entry is ever included in the back-end database. In other non-limiting embodiments, the data is first written to the original back-end database 110 without checking for data entry errors, and then the data entries are each automatically reviewed for errors according to the present invention.

Referring to FIG. 2, a non-limiting embodiment or aspect of a system 2000 for automatically detecting errors in at least one data entry is shown. In this non-limiting exemplary system 2000, a user 200 enters data into freeform inputs fields using a computing device 202. The computing device 202 may be any type of computing device, such as a mobile device or a desktop computer or other type of non-mobile computer. The data entries input by the user 200 may be communicated to an entry database 204 for storage. The computing device 202 may transmit the data entries to the entry database 204, or the entry database 204 may communicate with the computing device 202 to retrieve the data entries. The data entries may be communicated to the entry database 204 continuously in real time or according to a batch process. In some non-limiting embodiments, the computing device 202 first communicates with a modifying processor 206 to transmit the data entries to the modifying processor 206 before they are stored in the entry database 204. The modifying processor 206 may be a processor in the computing device 202 or a separate processor. The modifying processor 206 may be remote or local to the computing device 202.

With continued reference to FIG. 2, the modifying processor 206 is configured to automatically detect errors in the data entries entered by the user 200 into the computing device 202. The modifying processor 206 receives the data entries from the computing device 202 and/or the entry database 204 in order to automatically detect errors in the data entries. The modifying processor 206 may communicate with a predefined strings database 208 and/or a non-matching strings database 210 to detect errors in the data entries. Once the modifying processor 206 detects an error in a data entry, the modifying processor 206 may modify the data entry. Modifying the data entry may include communicating the modified data entry to the entry database 204 for storage or communicating with the entry database 204 to update the flawed data entry already stored in the entry database 204 with the modified data entry. However, other processes of modifying the flawed data entries may be used such that the entry database 204 stores the modified data entry.

With continued reference to FIG. 2, the predefined strings database 208 may include strings of characters known to be valid data entries. The predefined strings database 208 may store lists of data entries known to be valid. For example, for a freeform input field that asks for a city name, the predefined strings database 208 may include a list of known city names. As another example, for a freeform input field that asks for a merchant name, the predefined strings database 208 may include a list of known merchant names. Thus, the lists stored in the predefined strings database 208 may include anticipated data entries that are known to be correct. In some non-limiting embodiments, the database may be continually updated through results of the system or by a third party.

With continued reference to FIG. 2, the non-matching strings database 210 may include data entries previously reviewed by the modifying processor 206 but not determined to correlate with any data entries in the predefined strings database 208. After the modifying database 206 determines that a data entry does not match any data entries in the predefined strings database 208, it does not modify the data entry in the entry database 204, and it may also communicate that data entry (which did not correlate with a predefined data entry) to the non-matching strings database 210 for storage. The data entries stored in the non-matching strings database 210 may later be determined to be a valid data entry based on further user data input and may then become a data entry in the predefined strings database 208.

The result of the system 2000 shown in FIG. 2 is a more accurate entry database 204 containing fewer errors than the original data entries submitted to the computing device 202 by the user 200. The modifying processor 206 may automatically detect errors in data entries using any suitable method.

Figure 4:
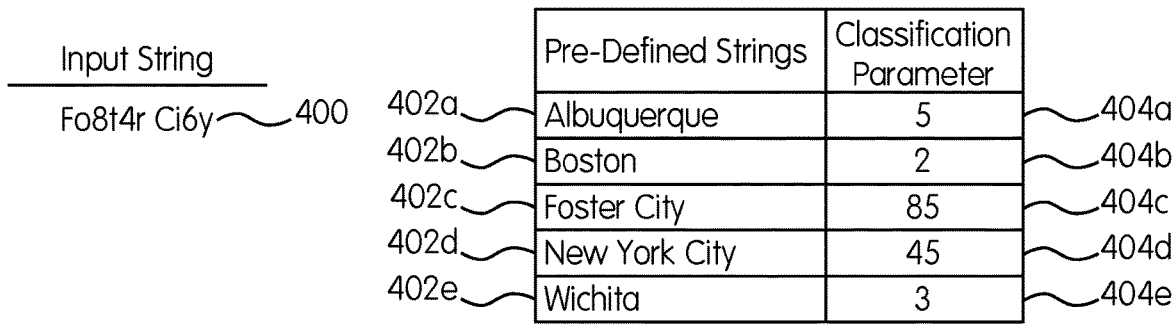
FIG. 4 shows a non-limiting embodiment or aspect of classification parameters associated with an image-based comparison of the input string and predefined strings.
Figure 5:
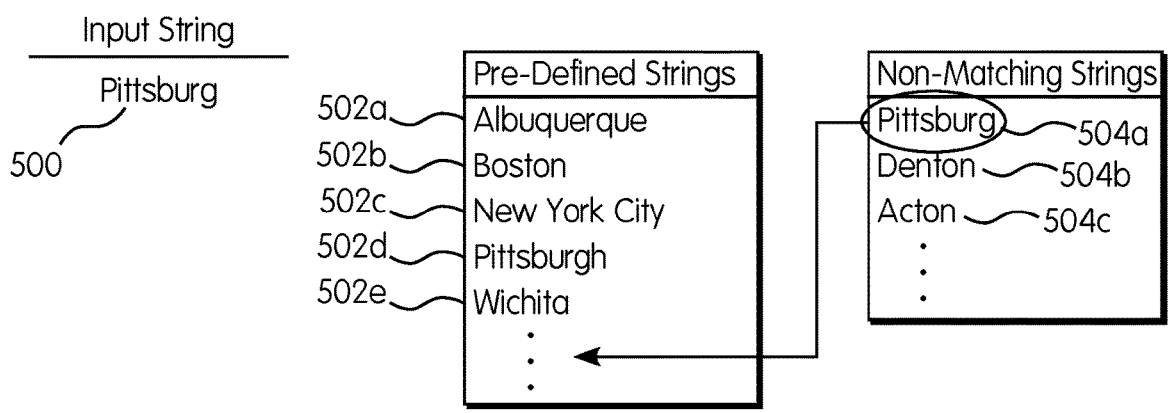
FIG. 5 shows a non-limiting embodiment or aspect of an input string, predefined strings, and non-matching strings.

Referring to FIGS. 3-5, the modifying processor 206 may automatically detect errors in the data entries using an image-based comparison protocol. In one non-limiting embodiment, the modifying processor 206 may generate a first image map based at least partially on the data entry (e.g., the input string of characters of the data entry). As used herein, the term "image map" may refer to any multi-dimensional representation of the text form data entry, such as a matrix or image representation of the text data entry.

FIG. 3 shows one non-limiting embodiment of generating an image map 304 based at least partially on the data entry. In FIG. 3, a data entry 300 (string of characters) is "abf". The modifying processor 206 utilizes a rules-based protocol 302 to convert the data entry 300 into the graphical representation that is the image map 304. In the rules-based protocol 302 in FIG. 3, the image map 304 is a matrix which includes (i) columns corresponding to character position within a respective string of characters and (ii) rows corresponding to a character index in a character set, the columns and rows defining the matrix. Each character represented by the image map 304 is represented by a location in the matrix associated with a column and a row. According to the rules-based protocol 302, the 'a' in the data entry 300 is located at [0,0] of the image map 304, with the first coordinate '0' representing the first position in the string and the second coordinate '0' representing the first letter of the alphabet. This is because the numeral '0' is used as the first column and row of the matrix, as opposed to using numeral '1'. According to the rules-based protocol 302, the 'b' in the data entry 300 is located at [1,1] of the image map 304 (matrix), based on being the second position in the string of characters and 'b' being the second letter of the alphabet. According to the rules-based protocol 302, the 'f' in the data entry 300 is located at [2,5] of the image map 304 (matrix), based on being the third position in the string of characters and 'b' being the sixth letter of the alphabet. Thus, for the data entry 300 "abf", the image map 304 is generated to graphically represent the data entry 300. An active cell of the matrix (e.g., [0,0], [1,1], [2,5]) may have a '1', a dot, or some other character and/or symbol placed therein, whereas non-active cells may have a '0', a null value, or some other character and/or symbol placed therein.

It will be appreciated that any conceivable string of characters can be represented in matrix form based on the previously-described rules-based protocol 302 to form an image representation (image map 304) of the string of characters. It will also be appreciated that alternative rules-based protocols that differently represent the characters in the string of characters to form an image representation of the string of characters may be used. For example, the image map may include an image of the data entry 300 "abf".

In some examples, a length of the data entry (e.g., characters in the input string) may be the same as a length of a predefined string. However, in other examples, a length of the data entry may be different from a length of a predefined string. In this example, the modifying processor 206 may generate image maps for the data entry and the predefined string having a same dimension corresponding to either the length of the data entry's string of characters or a length of the predefined string of characters, or some other length of characters different from both.

Referring to FIG. 4, the modifying processor 206 may generate at least one classification parameter by comparing the image map associated with the data entry from the computing device 202 with image maps based at least partially on the predefined strings in the predefined strings database 208. In other words, the image map of the data entry from the computing device 202 is compared with each image map representation of the predefined strings in the predefined strings database 208. Prior to generating the classification parameter, the image maps to be compared to generate the classification parameter may be compressed. The classification parameter may represent how similar the data entry from the computing device 202 is to each image map representation of the predefined strings in the predefined strings database 208. The classification parameter may be, for instance, a value, such that a high value represents similar image maps and a low value represents dissimilar image maps. The value may be on a scale, such as 1-10, 1-100, or any other suitable scale. The classification parameter may be a grade, such that the assigned grade represents how similar/dissimilar the image maps are to one another. Any other type of classification parameter may be used to quantify and/or qualify how similar/dissimilar the image maps are to one another.

With continued reference to FIG. 4, a specific example of generating classification parameters is shown. The example in FIG. 4 is not meant to be limiting. In this example, the data entry from the computing device 202 is input string 400 "Fo8t4r Ci6y", which is in response to a freeform input field of "City Name". In this system, the predefined strings database 208 includes the 5 cities shown in FIG. 4 as expected and known predefined strings 402*a-e*. The modifying processor 206 generates an image map for "Fo8t4r Ci6y", which is not shown herein. The modifying processor 206 also generates an image map for each of the known predefined strings 402*a-e*, which are not shown herein. By comparing the image map for "Fo8t4r Ci6y" with the image map for each of the known predefined strings 402*a-e*, the modifying processor 206 may generate a classification parameter 404*a-e* for each known predefined string 402*a-e*. As shown in the example, predefined string 402*c* "Foster City" is similar to "Fo8t4r Ci6y", and a comparison of its image maps by the modifying processor 206 generates a comparatively high classification parameter of 85 (on a 1-100 scale). In comparison, predefined string 402*b* "Boston" is dissimilar to "Fo8t4r Ci6y", and a comparison of its image maps by the modifying processor 206 generates a comparatively low classification parameter of 2 (on a 1-100 scale).

With continued reference to FIG. 4, the modifying processor 206 may determine, based at least partially on the classification parameter, whether data entry 400 (which does not exactly match predefined strings 402*a-e* from the predefined strings database 208) "correlates" to a predetermined string 402*a-e* of characters from the predefined strings database 208. "Correlate", as used herein, means that the data entry, while not exactly matching the predetermined string of characters from the predefined strings database 208 is similar enough, based at least in part by the classification parameter, that the data entry is considered as intending to be the same as the predetermined string of characters from the predefined strings database 208, such that the data entry should be modified to match exactly the predetermined string of characters from the predefined strings database 208.

The data entry may be determined to correlate with one of the predefined string using any suitable method. In one example, the data entry may be determined to correlate with one of the predefined strings using a rules-based protocol. For instance, if the classification parameter between the data entry and the predefined strings is above a certain threshold, the rules-based protocol may determine that the data entry correlates with the predefined string. In other embodiments, the rules-based protocol may specify that the data entry may automatically correlate with the predefined string with which it has the highest classification parameter (e.g., is most similar to).

In another non-limiting embodiment, to determine whether there is a correlation, the modifying processor 206 may generate a predictive model. For example, the predictive model may be based at least in part on images generated from historic data entries. In this way, the system may learn from previous image maps found to correlate with one another. For example, classifiers (e.g., SVM, Random Forrest, and the like) may be used for learning whether a correlation exists. The modifying processor 206 may determine that the data entry correlates with the predefined string based at least partially on application of the predictive model to the image map of the data entry.

In response to determining that the data entry correlates with the predefined string, the modifying processor 206 may communicate with the entry database 204, such that the modified data entry (matching the predefined string) is stored in the entry database 204.

Referring to FIG. 5, a data entry 500 may be determined to not correlate with any predefined string 502*a-e* from the predefined strings database 208. In some non-limiting embodiments or aspects, the input string 500 that has been determined to not correlate with any predefined string 502*a-e* from the predefined strings database 208 may be compared to another string that is a previously non-matching string 504*a-c*. A previously non-matching string 504*a-c* may be a string that was previously compared to the predefined strings 502*a-e* but was also determined to not correlate with any predefined string 502*a-e*.

The data entry 500 may be compared against the previously non-matching strings 504*a-c* using the same methods previously described. For example, the modifying processor 206 may generate a classification parameter by comparing the image map for the data entry 500 to the each image map of the previously non-matching strings 504*a-c*. In some non-limiting embodiments, the data entry 500 may need to have a classification parameter that corresponds to the data entry 500 exactly matching one of the previously non-matching strings 504*a-c*.

With continued reference to FIG. 5, upon the modifying processor 206 determining that the data entry 500 correlates to one of the previously non-matching strings 504*a-c*, the modifying processor 206 may store the data entry 500 or the correlating non-matching string 504*a-c* in the predefined strings database 208 such that the data entry 500 or the correlating non-matching string 504*a-c* becomes a new predefined string (to be compared against subsequent data entries). By way of example, in FIG. 5, the data entry 500 is "Pittsburg" (such as Pittsburg, Kans.), but the city "Pittsburg" is not included in the predefined strings 502*a-e*. However, past users have entered "Pittsburg" (because it corresponds to a real city in the United States) and it was stored by the modifying processor 206 in the non-matching strings database 210 as a previously non-matching string 504*a*. The modifying processor 206 determines that data entry 500 matches previously non-matching string 504*a* (e.g., by comparing image maps and generating a classification parameter), which is then stored in the predefined strings database 208 as a new predefined string for comparison with subsequent data entries.

In some non-limiting embodiments, a data entry 500 that matches a non-matching string a single time may trigger the data entry 500 and/or the non-matching string being stored as a predefined string. However, in other embodiments, a predetermined number of identical input strings that match the non-matching string must first be entered before the data entry 500 and/or the non-matching string is stored as a predefined string. For instance, various users may need to enter the same non-matching data entry at least 10 times before the system determines that the non-matching data entry is a correct data entry and should be classified as a predefined data entry. Various rules may be implemented as to when a repeated non-matching string becomes a predefined string. In this way, the system may be self-learning by determining that data entries previously determined to be non-matching and considered to contain an error may be subsequently considered a predefined, correct data entry based on the data entry being entered by multiple users.

Figure 6:
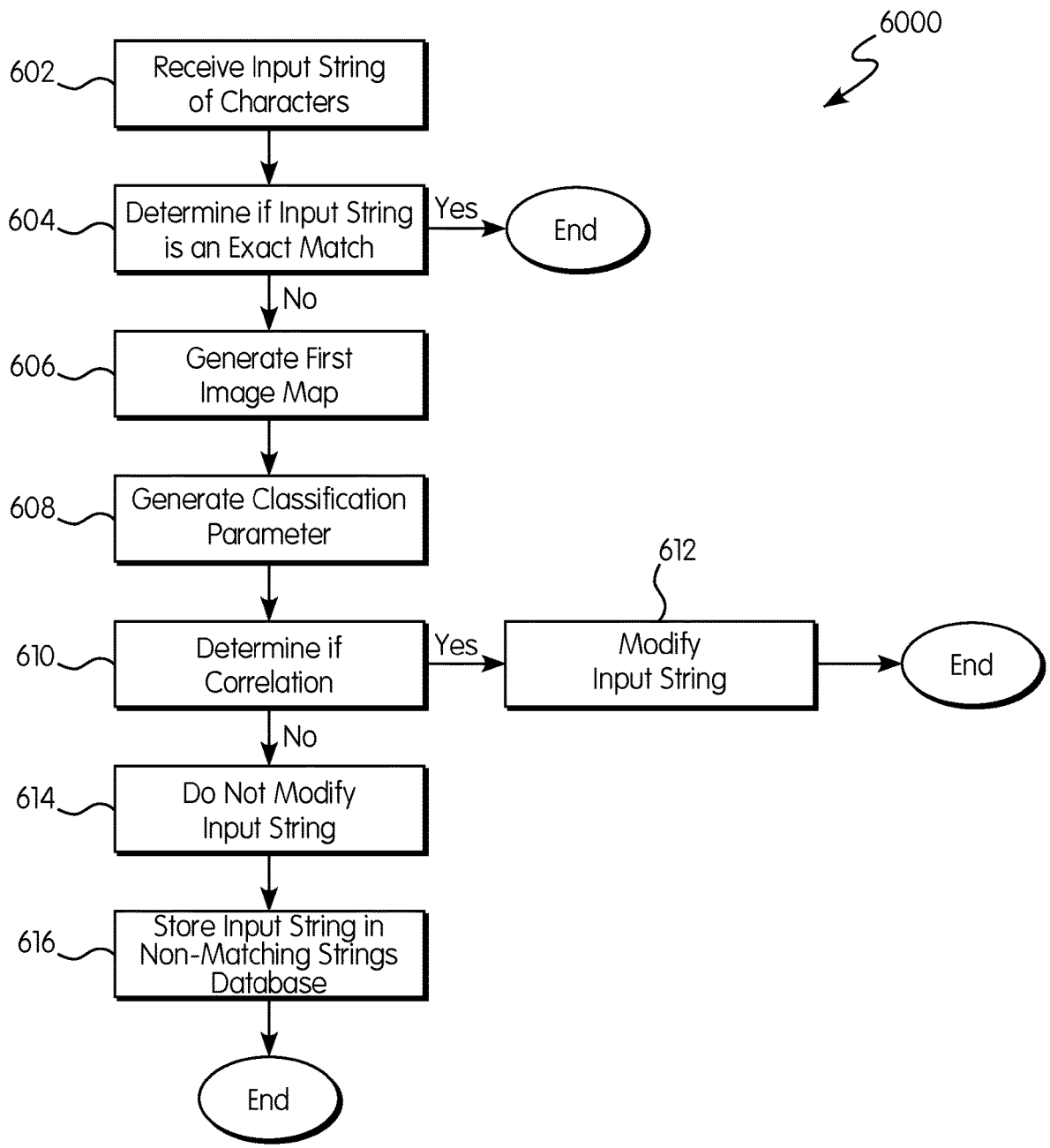
FIG. 6 is a non-limiting embodiment or aspect of a method for automatically detecting errors in at least one data entry.

Referring to FIG. 6, a non-limiting method 6000 for automatically detecting errors in at least one data entry is shown. At a step 602, the modifying processor 206 may receive a data entry from the entry database 204 or the computing device 202. At a step 604, the modifying processor 206 may determine whether the data entry is an exact match with a predefined string from the predefined strings database 208. This matching may occur using any of the previously-described image-based comparison processes or may be based on a textual comparison of the data entry and the predefined strings. If the data entry is determined by the modifying processor 206 to exactly match a predefined string, the process may end. If the data entry is determined by the modifying processor 206 to not exactly match any predefined string, the process may continue to step 606. At step 606, the modifying processor 206 may generate an image map of the data entry. The modifying processor 206 may also generate an image map of at least one of the predefined strings. The image maps may be generated as previously described. At a step 608, the modifying processor 206 may generate a classification parameter by comparing the image map of the data entry with the image map of one of the predefined strings. At a step 610, the modifying processor 206 may determine if the data entry correlates to the predefined strings. Steps 606-610 may be repeated for comparing the data entry with each predefined string in the predefined strings database 208, if necessary (e.g., until a correlation is determined). At a step 612, upon the modifying processor 206 determining that the data entry correlates to a predefined string, the modifying processor 206 may modify the data entry to match the predefined string, which may be stored in the entry database 204 (so the entry database 204 contains the updated/modified data entry). If the data entry is determined to not correlate with any of the predefined strings the data entry in the entry database 204 is not modified (step 614). At a step 616, the modifying processor 206 may store the non-matching data entry in the non-matching strings database 210.

Figure 7:
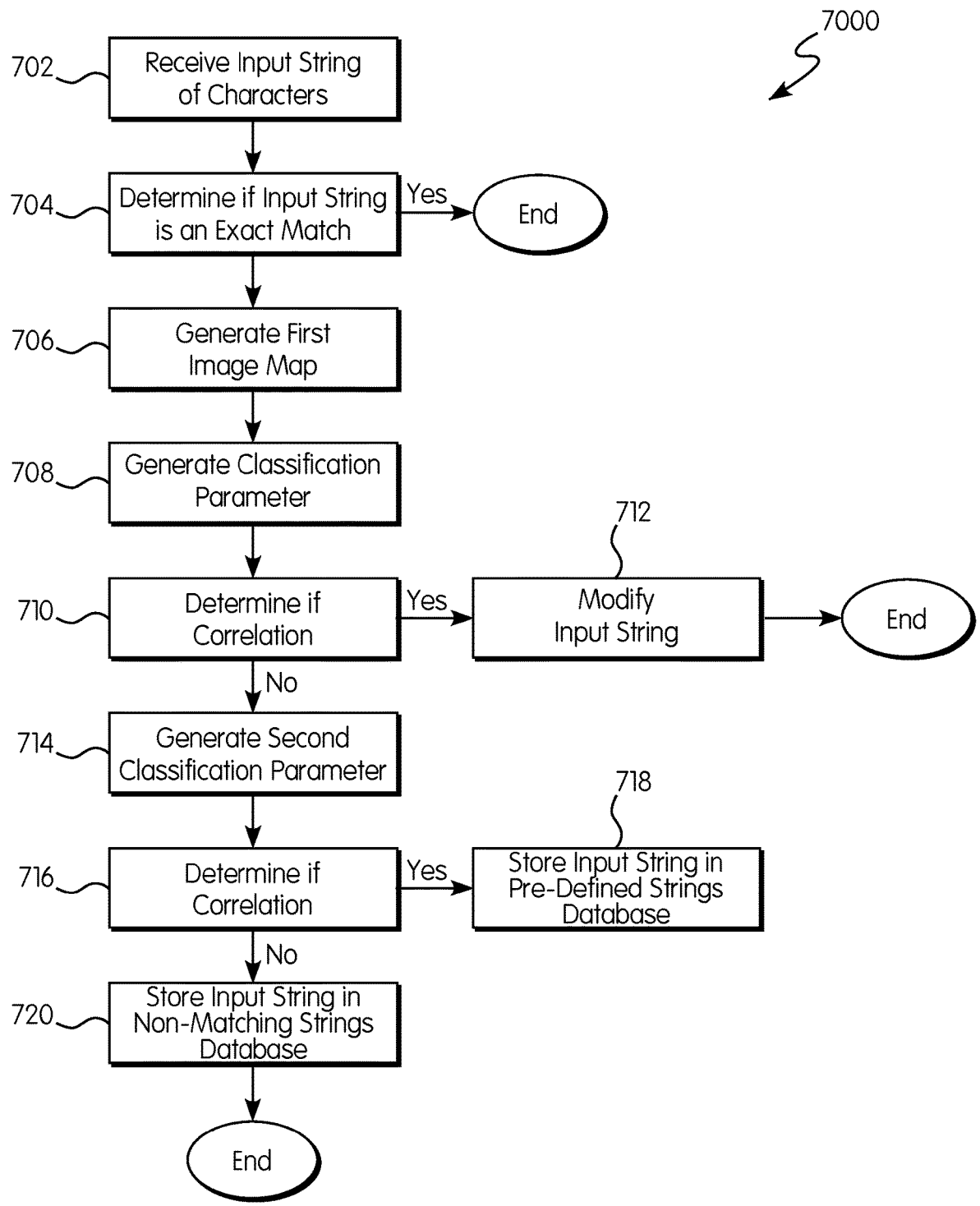
FIG. 7 is a non-limiting embodiment or aspect of another method for automatically detecting errors in at least one data entry.

Referring to FIG. 7, another non-limiting method 7000 for automatically detecting errors in at least one data entry is shown. Step 702 of method 7000 may be identical to step 602 of method 6000. Step 704 of method 7000 may be identical to step 604 of method 6000. Step 706 of method 7000 may be identical to step 606 of method 6000. Step 708 of method 7000 may be identical to step 608 of method 6000. Step 710 of method 7000 may be identical to step 610 of method 6000. Step 712 of method 7000 may be identical to step 612 of method 6000. At a step 714, upon the modifying processor 206 determining that the data entry does not correlate with a predefined string, the modifying processor 206 may generate a classification parameter based on a comparison of the image map of the data entry with an image map of each previously non-matching string from the non-matching strings database 210. At a step 716, the modifying processor 206 may determine if the data entry correlates with any previously non-matching string, as previously described. At a step 718, if the modifying processor 206 determines that the data entry correlates with a previously non-matching string, the modifying processor 206 may store the data entry and/or the previously non-matching string in the predefined strings database 208 as a new predefined string. In some non-limiting embodiments Step 718 may be performed by the modifying processor 206 upon the data entry exactly matching a previously non-matching string. In some non-limiting embodiments, step 718 may be performed by the modifying processor 206 upon the data entry correlating to the previously non-matching string a predetermined number of times (multiple users inputting the same data entry identifying a pattern and indicating that the entry is a valid entry) before the data entry and/or the previously non-matching string is stored as a predefined string. At a step 720, upon the modifying processor 206 determining that the data entry does not correlate to any of the previously non-matching strings, the modifying processor 206 may store the data entry in the non-matching strings database 210.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of automatically detecting errors in at least one data entry in a database, the at least one data entry comprising text data comprising an input string of characters that do not match text data comprising at least one predefined string of characters, the method comprising:
   generating, with at least one processor and based at least partially on the input string of characters, a first matrix comprising a matrix representation of the input string of characters;
   generating, with at least one processor, at least one classification parameter by comparing the first matrix to a second matrix, the second matrix comprising a matrix representation of the predefined string of characters, wherein the at least one classification parameter is generated based on a predictive model to determine a correlation between the first matrix and the second matrix;
   based on the at least one classification parameter, detecting an error in the at least one data entry by determining, with at least one processor, that the input string of characters correlates to the predefined string of characters; and
   in response to detecting the error in the at least one data entry, modifying, with at least one processor, the at least one data entry to match the predefined string of characters by causing the predefined string of characters to be stored in a database in place of the input string of characters or updating an entry stored in the database associated with the input string of characters with the predefined string of characters.

2. The method of claim 1, wherein determining that the input string of characters correlates to the predefined string of characters comprises:
   generating, with at least one processor, the predictive model for determining correlations between matrices, the predictive model based at least partially on matrices generated from historic data entries; and
   determining, with at least one processor, that the input string of characters corresponds to the predefined string of characters based at least partially on application of the predictive model to the first matrix.

3. The method of claim 1, wherein the first matrix and the second matrix each comprise: (i) columns corresponding to a character position within a respective string of characters and (ii) rows corresponding to a character index in a character set, the columns and rows defining the matrices, wherein each character represented by the first matrix and the second matrix is represented by a location in the matrix associated with a column and a row.

4. The method of claim 1, wherein a length of the input string of characters is different from a length of the predefined string of characters, and wherein the first matrix and the second matrix are generated to have a same dimension corresponding to either the length of the input string of characters or the length of the predefined string of characters.

5. The method of claim 1, wherein the first matrix and the second matrix are compressed prior to generating the at least one classification parameter.

6. The method of claim 1, wherein the at least one data entry is manually inputted by a user into a freeform input field.

7. A system for automatically detecting errors in at least one data entry in a database, the at least one data entry comprising text data comprising an input string of characters that do not match text data comprising at least one predefined string of characters, the system comprising at least one processor configured to:
generate, based at least partially on the input string of characters, a first matrix comprising a matrix representation of the input string of characters;
generate at least one classification parameter by comparing the first matrix to a second matrix, the second matrix comprising a matrix representation of the predefined string of characters, wherein the at least one classification parameter is generated based on a predictive model to determine a correlation between the first matrix and the second matrix;
based on the at least one classification parameter, detect an error in the at least one data entry by determining, whether the input string of characters correlates to the predefined string of characters; and
in response to detecting the error in the at least one data entry, modify the at least one data entry to match the predefined string of characters by causing the predefined string of characters to be stored in a database in place of the input string of characters or updating an entry stored in the database associated with the input string of characters with the predefined string of characters.

8. The system of claim 7, wherein, to determine that the input string of characters correlates to the predefined string of characters, the at least one processor is further programmed and/or configured to:
generate the predictive model for determining correlations between matrices, the predictive model based at least partially on matrices generated from historic data entries; and
determine that the input string of characters corresponds to the predefined string of characters based at least partially on application of the predictive model to the first matrix.

9. The system of claim 7, wherein the first matrix and the second matrix each comprise: (i) columns corresponding to a character position within a respective string of characters and (ii) rows corresponding to a character index in a character set, the columns and rows defining the matrix, wherein each character represented by the first matrix and the second matrix is represented by a location in the matrix associated with a column and a row.

10. The system of claim 7, wherein a length of the input string of characters is different from a length of the predefined string of characters, and wherein the first matrix and the second matrix are generated to have a same dimension corresponding to either the length of the input string of characters or the length of the predefined string of characters.

11. The system of claim 7, wherein the first matrix and the second matrix are compressed prior to generating the at least one classification parameter.

12. The system of claim 7, wherein the at least one data entry is manually inputted by a user into a freeform input field.

13. The system of claim 7, wherein in response to determining that the input string of characters does not correlate to the predefined string of characters, the at least one processor is further programmed and/or configured to generate a second classification parameter by comparing the first matrix to a third matrix, the third matrix comprising a matrix representation of a stored string of characters representative of a prior non-correlated data entry, wherein the prior non-correlated data entry comprises a previously-received input string of characters previously determined to not correlate to the at least one predefined string of characters.

14. The system of claim 13, wherein the at least one processor is further programmed and/or configured to store, based at least partially on the second classification parameter, the at least one data entry in a database in association with the prior non-correlated data entry, such that the input string of characters and/or the stored string of characters form a new predefined string of characters for comparison to subsequent data entries.

* * * * *

UNITED STATES PATENT AND TRADEMARK OFFICE
CERTIFICATE OF CORRECTION

| | | |
|---|---|---|
| PATENT NO. | : 10,956,402 B2 | Page 1 of 1 |
| APPLICATION NO. | : 15/952699 | |
| DATED | : March 23, 2021 | |
| INVENTOR(S) | : Hima Patel | |

It is certified that error appears in the above-identified patent and that said Letters Patent is hereby corrected as shown below:

On the Title Page

Item (54) and in the Specification, Column 1, Line 3, delete "DATE" and insert -- DATA --

In the Claims

Column 17, Line 41, Claim 7, delete "determining," and insert -- determining --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*